(12) United States Patent
Kim et al.

(10) Patent No.: US 11,180,201 B2
(45) Date of Patent: Nov. 23, 2021

(54) TRUCK, DECK GATE FOR TRUCK AND METHOD FOR MANUFACTURING THEREOF

(71) Applicants: KOLON GLOTECH, INC., Seoul (KR); KOLON INDUSTRIES INC., Seoul (KR); KOLON DACC COMPOSITE CO., LTD., Haman-gun (KR)

(72) Inventors: Dong Won Kim, Gimpo (KR); Woo Jin Jung, Ulsan (KR); Chang Hun Lee, Gumi (KR); Hyun Kyu Shin, Seoul (KR); Dae Il Lee, Seoul (KR); Jin Wook Han, Jeonju (KR)

(73) Assignees: KOLON GLOTECH, INC., Seoul (KR); KOLON INDUSTRIES INC., Seoul (KR); KOLON DACC COMPOSITE CO., LTD., Haman-gun (KR)

(*) Notice: Subject to any disclaimer, the term of this patent is extended or adjusted under 35 U.S.C. 154(b) by 288 days.

(21) Appl. No.: 16/446,502

(22) Filed: Jun. 19, 2019

(65) Prior Publication Data
US 2019/0389516 A1   Dec. 26, 2019

(30) Foreign Application Priority Data

Jun. 20, 2018  (KR) .................. 10-2018-0070935

(51) Int. Cl.
| | | |
|---|---|---|
| B62D 33/03 | (2006.01) | |
| B29C 70/48 | (2006.01) | |
| B62D 29/04 | (2006.01) | |
| B29K 27/06 | (2006.01) | |
| B29K 31/00 | (2006.01) | |
| B29K 105/04 | (2006.01) | |

(Continued)

(52) U.S. Cl.
CPC .............. B62D 33/03 (2013.01); B29C 70/48 (2013.01); B62D 29/043 (2013.01); *B29K 2027/06* (2013.01); *B29K 2031/00* (2013.01); *B29K 2105/04* (2013.01); *B29K 2105/089* (2013.01); *B29K 2309/08* (2013.01); *B29L 2031/3005* (2013.01)

(58) Field of Classification Search
CPC ........ B62D 33/03; B62D 29/043; B29C 70/48
USPC ...................................................... 296/57.1
See application file for complete search history.

(56) References Cited

U.S. PATENT DOCUMENTS

| | | | |
|---|---|---|---|
| 7,575,264 B1* | 8/2009 | Solomon ............... | B60P 7/0815 296/183.1 |
| 2009/0115222 A1* | 5/2009 | Hohnl ..................... | B60Q 3/30 296/183.1 |

(Continued)

FOREIGN PATENT DOCUMENTS

| | | | |
|---|---|---|---|
| JP | 2000233464 A | * | 8/2000 |
| KR | 20140063041 A | | 5/2014 |

(Continued)

*Primary Examiner* — Joseph D. Pape

(57) ABSTRACT

Disclosed herein is a truck, a deck gate for truck, and a method for manufacturing thereof. According to the present invention, the deck gate for truck has excellent impact strength, low plastic deformation rate, excellent molding property and thermal resistance, and reduces weight. Also, the deck gate for truck according to the present invention reduces weight of about 23% in comparison with a conventional steel and wood type deck gate for truck.

5 Claims, 15 Drawing Sheets

(51) Int. Cl.
  *B29K 105/08* (2006.01)
  *B29K 309/08* (2006.01)
  *B29L 31/30* (2006.01)

(56) References Cited

U.S. PATENT DOCUMENTS

2014/0096708 A1* 4/2014 Pherson ............. B65D 19/0004
                                                    108/56.3
2017/0095953 A1* 4/2017 Munenobu ........... C08K 5/3465

FOREIGN PATENT DOCUMENTS

KR         101730043 B1 *  4/2017
WO    WO-2017163804 A1 *  9/2017  ............. B32B 7/022

* cited by examiner (Bending Test)

(Simulation)

| Classification | Breakage Form | | Absorption | | Max. Load (kgf) |
|---|---|---|---|---|---|
| | Front | Side/Rear | Room Temp. | Low Temp. | |
| Conventional Product (Aluminum) | Front | Side | 18.1 | - | 566 |
| Pultrusion Type (FRP) | Front | Rear | 2.8 | 2.5 | 26.4 |
| Present Invention (Woven Roving + UP) | Room Temp | -40°C | 15.8 | 15.6 | 660 |

Fig. 13

1 Side gate FR X 2

4,019mm • 400mm

2 Side gate RR X 2

3,339mm

3 Tail gate X 1

2,307mm

TRUCK, DECK GATE FOR TRUCK AND METHOD FOR MANUFACTURING THEREOF

CROSS REFERENCE TO RELATED APPLICATION

This application claims the benefit of Korean Patent Application No. 10-2018-0070935, filed Jun. 20, 2018, which is hereby incorporated by reference in its entirety into this application.

TECHNICAL FIELD

The present invention relates to a truck, a deck gate for truck, and method for manufacturing thereof.

BACKGROUND ART

Generally, deck gates for truck have a double structure in which a steel and a wood wick are combined. The deck gates have been used in a circumstance exposed on rain or snow, so that they may malfunction. To overcome these disadvantages, aluminum-type deck gates have been developed. However, due to high cost, deck gates manufactured by low cost have been required. Also, there is a need to additionally reduce weight owing to low weight lightening rate.

Accordingly, deck gates for truck with improved strength, corrosion resistance, abrasion resistance, fatigue life, impact resistance, weight lightening, low-temperature resistance, heat resistance, and so forth have been increased in a recent year.

PRIOR ART

Patent Document (Patent Document) Korean Patent Laid-open No. 10-2014-0063041

SUMMARY OF THE INVENTION

It is therefore an object of the present invention to provide a method for manufacturing a deck gate for truck comprising forming a body including a core layer and a skin layer for protecting the core layer, arranging a finishing unit on circumference of the body, and arranging a hinge unit in the body.

It is another object of the present invention to provide a deck gate for truck comprising a body located outside a deck of a loading part. The body includes a core layer made of resins and a skin layer including a reinforced fiber and resins and respectively arranged on one surface and the other surface of the core layer.

It is still a further object of the present invention to provide a truck including the deck gate for truck comprising a vehicle body frame, a riding part located at one end of the vehicle body frame, and a loading part located at the other end of the vehicle body frame. In this case, the loading part includes a deck, a tail gate opposite to the riding part at a predetermined interval and mounted on the deck, and a couple of side gates opposite each other at a predetermined interval between the riding part and the tail gate.

Embodiments of the present invention provides a method for manufacturing a deck gate for truck comprising forming a body including a core layer and a skin layer for protecting the core layer, arranging a finishing unit on circumference of the body, and arranging a hinge unit in the body.

Pursuant to embodiments of the present invention, forming the body further comprises preparing a reinforced fiber with non-impregnated resin on a mold, stacking the core layer with foam type on an upper portion of the reinforced fiber, stacking the reinforced fiber with non-impregnated resin on an upper portion of the core layer, and impregnating resin in the reinforced fiber to form the skin layer hardened on the upper portion and a lower portion of the core layer. In this case, the outer skin, the core layer, and the inner skin are sequentially stacked.

Pursuant to embodiments of the present invention, a thickness ratio of the outer skin, the core layer, and the inner skin is 1:5 to 7:1.

Pursuant to embodiments of the present invention, the reinforced fiber is one or more selected from the group consisting of a glass fiber, a carbon fiber, and an aramid fiber.

Pursuant to embodiments of the present invention, the resin is one or more selected from the group consisting of epoxy, cyanate ester, vinyl ester, and unsaturated polyester.

Pursuant to embodiments of the present invention, the outer skin and the inner skin have 40 to 70 weight % of the reinforced fiber and 30 to 60 weight % of the resin, respectively.

Pursuant to embodiments of the present invention, the core layer includes one or more selected from the group consisting of polyvinyl chloride resin, polyurethane resin, acryl resin, polystyrene resin, polyetherimide resin, and styrene-acrylonitrile copolymer.

Pursuant to embodiments of the present invention, the core layer includes one or more selected from the group consisting of polyvinyl chloride resin, polyurethane resin, acryl resin, polystyrene resin, polyetherimide resin, and styrene-acrylonitrile copolymer.

Pursuant to embodiments of the present invention, the deck gate for truck is manufactured through VA-RTM process.

Embodiments of the present invention provides a deck gate for truck comprising a body located outside a deck of a loading part. The body includes a core layer made of resins and a skin layer including a reinforced fiber and resins and respectively arranged on one surface and the other surface of the core layer.

Pursuant to embodiments of the present invention, the deck gate for truck further comprises a finishing unit arranged along an outer circumstance of the body and a plurality of hinge units for connecting the body to the deck.

Pursuant to embodiments of the present invention, the skin layer includes an inner skin arranged on one surface of the core layer and an outer skin arranged on the other surface of the core layer where the plurality of hinge units arranged at a predetermined interval, a plurality of reinforced bars are arranged at a predetermined interval in the inner skin, and the reinforced bars are connected to the hinge unit.

Pursuant to embodiments of the present invention, the reinforced fiber is one or more selected from the group consisting of a glass fiber, a carbon fiber, and an aramid fiber, and the resin one or more selected from the group consisting of epoxy, cyanate ester, vinyl ester, and unsaturated polyester.

Pursuant to embodiments of the present invention, the outer skin and the inner skin have 40 to 70 weight % of the reinforced fiber and 30 to 60 weight % of the resin, respectively.

Pursuant to embodiments of the present invention, the core layer includes one or more selected from the group consisting of polyvinyl chloride resin, polyurethane resin, acryl resin, polystyrene resin, polyetherimide resin, and styrene-acrylonitrile copolymer.

Embodiments of the present invention provides a truck including the deck gate for truck comprising a vehicle body frame, a riding part located at one end of the vehicle body frame, and a loading part located at the other end of the vehicle body frame. In this case, the loading part includes a deck, a tail gate opposite to the riding part at a predetermined interval and mounted on the deck, and a couple of side gates opposite each other at a predetermined interval between the riding part and the tail gate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein

FIG. 13 shows the impact test results;

DETAILED DESCRIPTION

Figure 1:
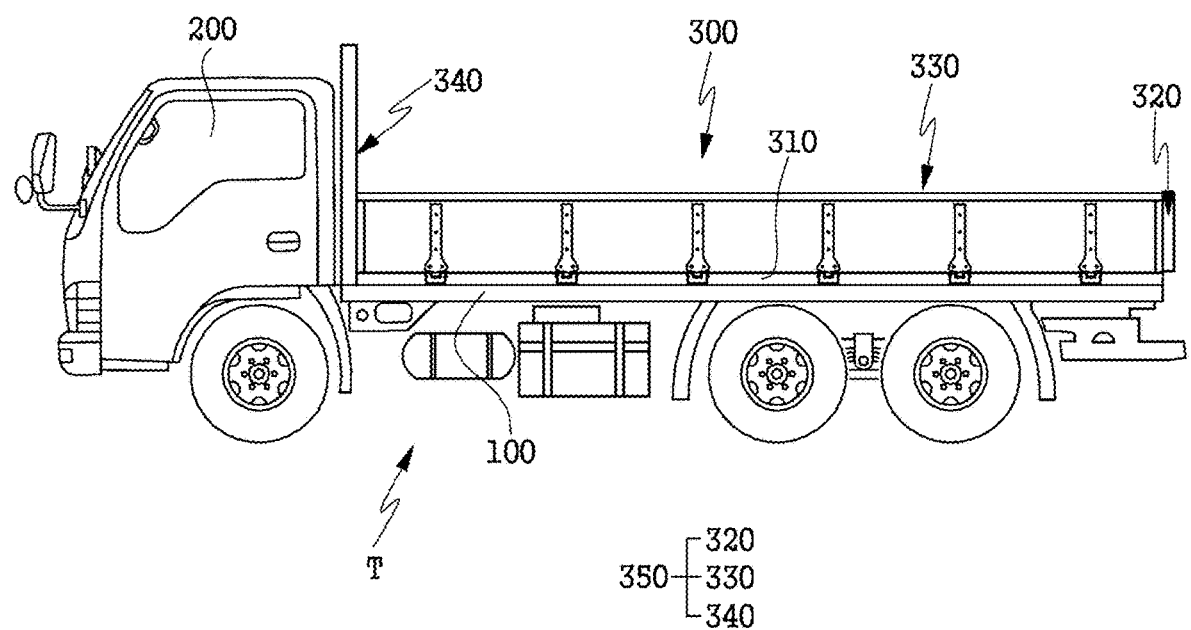
FIG. 1 is a schematic view showing a truck according to an embodiment of the present invention.

Hereinafter, the present invention will be described in detail with reference to the drawings. In describing the present invention, detailed descriptions related to publicly known functions or configurations will be omitted in order not to obscure the gist of the present invention.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

The present invention may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

The terminology which is used in common will be used for the purpose of description and not of limitation. Furthermore, terms and words used by the applicant may be used for special cases. In this case, the meaning of terms or words must be understood with due regard to the meaning expressed in the specification rather than taking into account only the basic meaning of the terms and words.

Hereinafter, the technical construction of the present invention will be described in detail with reference to preferred embodiments illustrated in the attached drawings.

A deck gate for a truck according to an embodiment of the present invention can be applied to a truck as an embodiment of the present invention. The following description focuses on trucks with truck deck gates.

A truck according to an embodiment of the present invention will be described with reference to FIG. 1.

FIG. 1 is a schematic view showing a truck according to an embodiment of the present invention.

Referring to FIG. 1, a truck T according to the present invention includes a vehicle body frame 100, a riding part 200, and a loading part 300 to improve durability and impact strength of the loading part.

The vehicle body frame 100 constitutes the basic structure of the truck T, various kinds of elements for driving are installed. The riding part 200 is positioned at one end of the vehicle body frame 100 and has a space in which drivers can ride. A conventional art can applies to the detailed structure of the vehicle body frame 100, and the riding part 200, and thus the explanation thereof will be omitted to avoid duplicate description.

The loading part 300 is positioned at the other end of the vehicle body frame 100 and creates a space in which packages are carried. The loading part 300 includes a deck 310 arranged on the vehicle body frame 100 to have a space in which packages are carried, a tail gate 320 positioned at a rear end of the deck 310 and opposite to the riding part 200 at a predetermined interval, and a couple of side gates 330 positioned between the riding part 200 and the tail gate 320. The side gate 330 is arranged at both sides of the deck 310 in the width direction, respectively. The loading part 300 further includes a front gate 340 positioned at fore-end of the deck 310 to be connected to the side gate 330. The side gate 330 and tail gate 320 prevent packages from being dropped from the deck 310.

The lower parts of the tail gate 320 are hinge-connected to the deck 310, and the upper parts of the tail gate 320 are connected through a link member to the side gate 330 (not shown). The tail gate 320 is opened when the link member is separated from the side gate 330. The detailed structure of the above deck 310 and the tail gate 320 can adopt constitutions of a well-known loading part for truck, and thus the detailed structure thereof is omitted.

In the present invention, the deck 310 is equivalent to a part forming a board of a loading part of a truck. The deck gate 350 includes the tail gate 320, the side gate 330, or the front gate 340 of the loading part of the truck. Hereinafter, the side gate 330 will be described in more detail.

Figure 2:
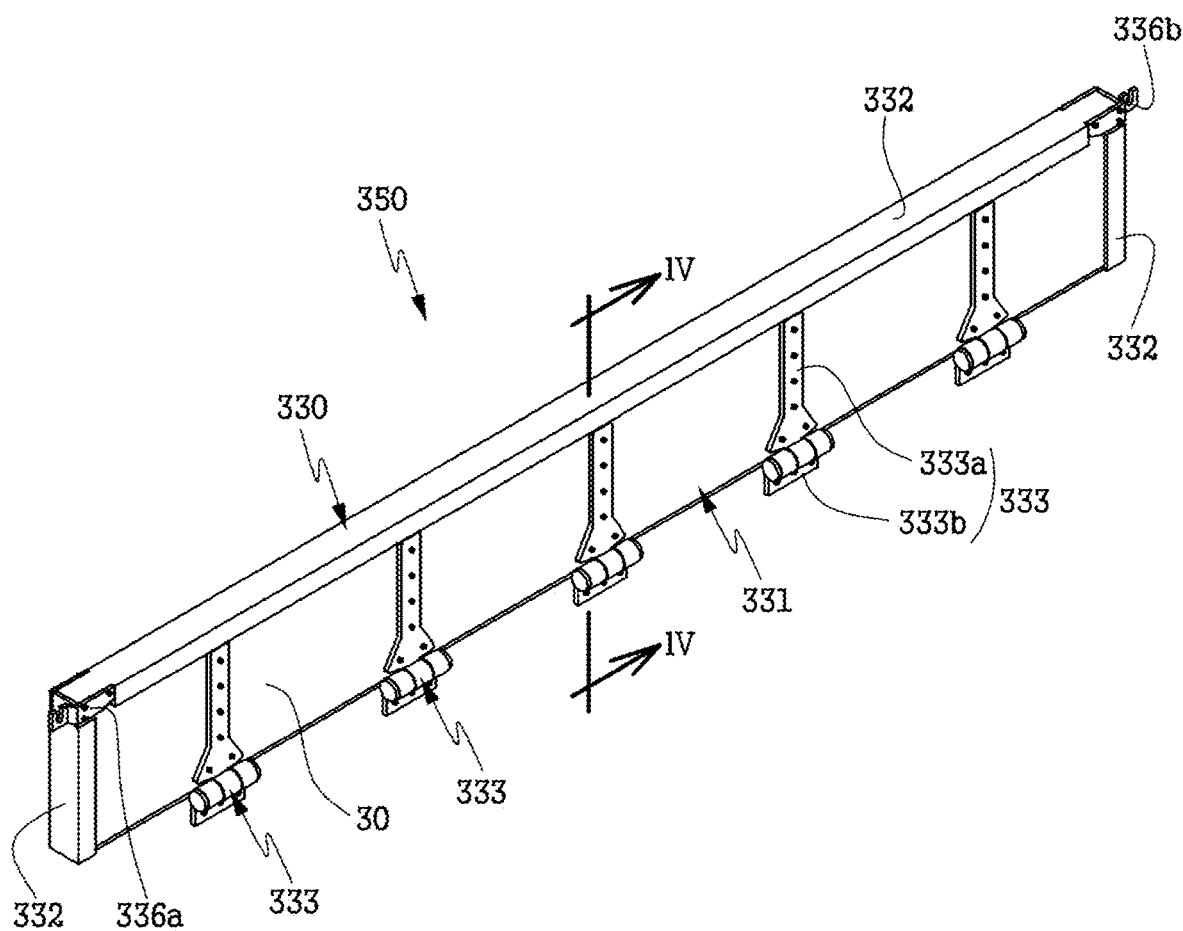
FIG. 2 is a perspective view of a deck gate of FIG. 1.
Figure 3:
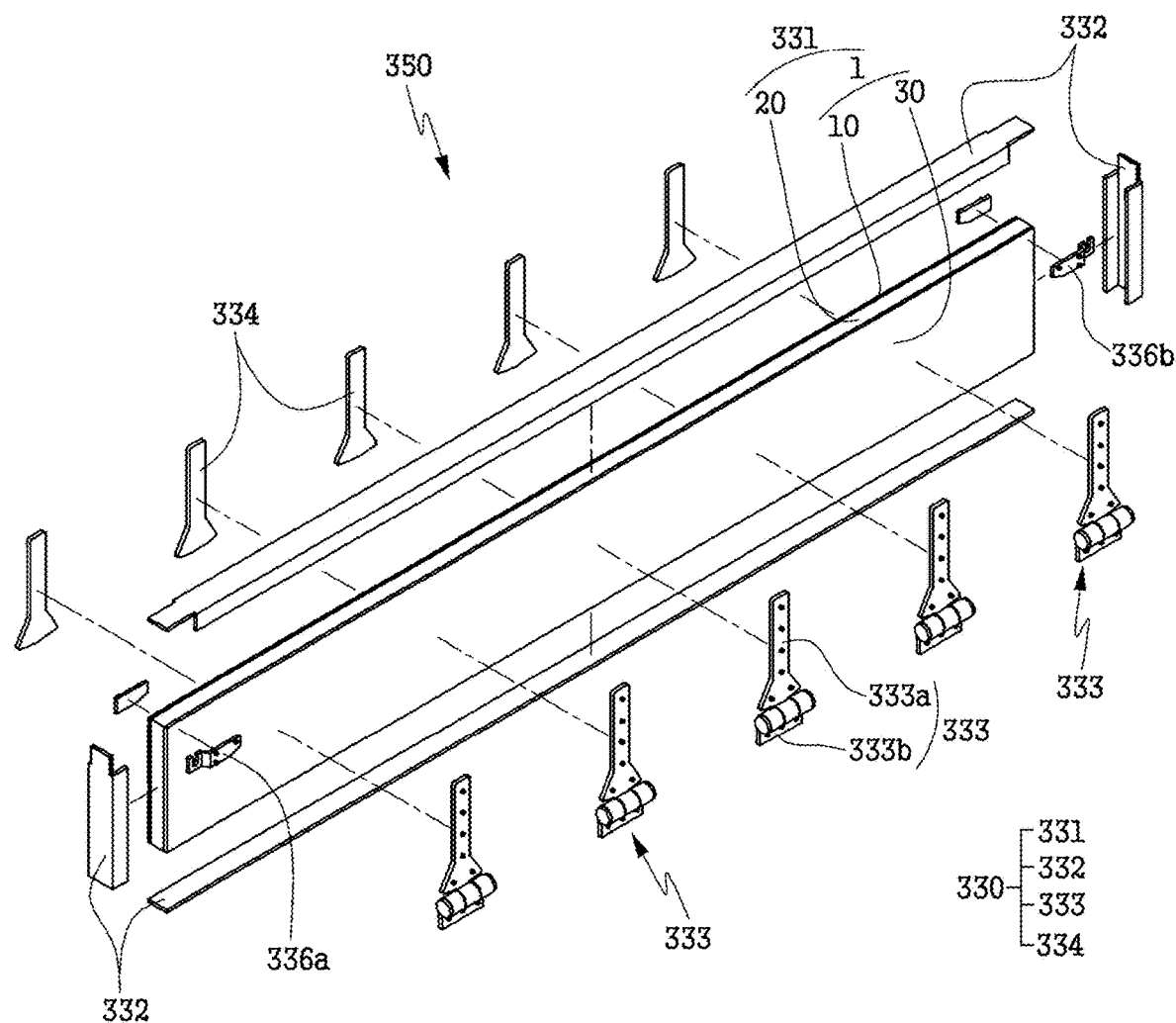
FIG. 3 is an exploded perspective view of a deck gate of FIG. 2.
Figure 4:
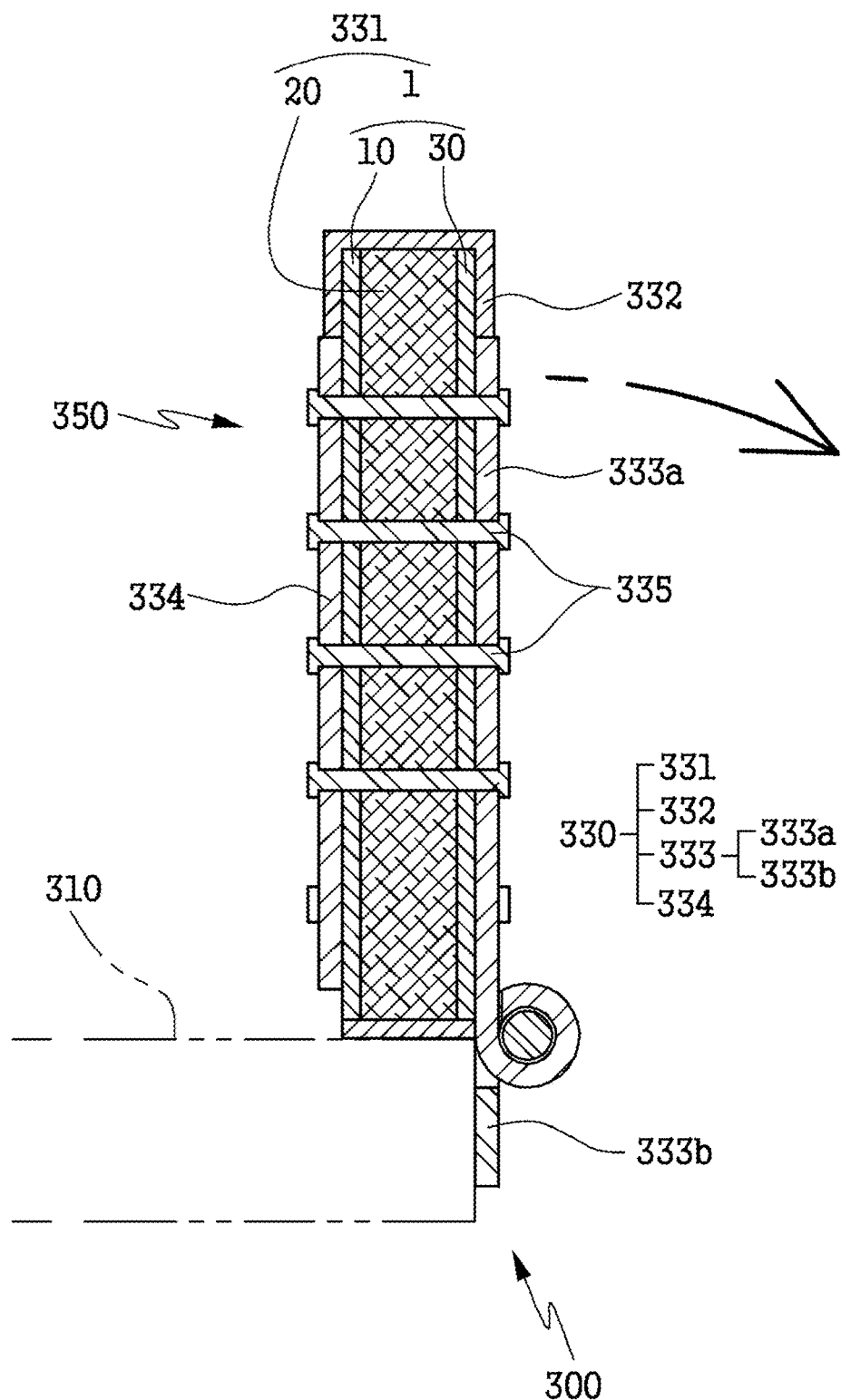
FIG. 4 is a cross-sectional view taken along lines IV-IV of FIG. 2.

Referring to FIGS. 2 to 4, the side gate 330 among the deck gates 350 is shown. The side gate 330 includes the body 331.

The body 331 a core layer 20 and a skin layer 1. The core layer is formed by foaming and hardening resins using a foaming agent. The skin layer 1 includes a reinforced fiber and resins and arranged at one surface and the other surface of the core layer 20. The body 331 constitutes a basic shape of the side gate 330.

The core layer 20 maintains strength of the body 331. The core layer 20 includes one or more selected from the group consisting of polyvinyl chloride resin, polyurethane resin, acryl resin, polystyrene resin, polyetherimide resin, and styrene-acrylonitrile copolymer.

The skin layer 1 includes an inner skin 10 positioned at one surface of the core layer 20 and an outer skin 30 positioned at the other surface of the core layer 20. The inner and outer skins 10 and 30 protect the core layer 20 from external factors such as impacts, pollutants, and so forth.

The inner and outer skins 10 and 30 are formed by impregnating resin into reinforced fibers. The resin is one or more selected from the group consisting of epoxy, cyanate ester, vinyl ester, and unsaturated polyester.

The body 331 has a sandwich-panel shape and in which the outer skin 30, the core layer 20, and inner skin 10 are sequentially arranged. For this reason, the deck gate has excellent impact strength and low permanent deformation rate. In addition, resin forming the core layer 20 is formed in foam type so that the weight of the body 331 can be reduced. The body 331 is formed of the outer skin 30, the core layer 20, and the inner skin 10, and formed of composite materials, thereby making up for structural properties of the deck gate 350.

The deck gate 350 may further include a finishing unit 332 and a hinge unit 333.

The finishing unit 332 is arranged along circumference of the body 331 to be combined with edges of the skin layer 1. The finishing unit 332 consists of an upper finishing unit, a lower finishing unit, and a lateral finishing unit. In this case, the lower finishing unit or the lateral finishing unit can be omitted.

The finishing unit 332 protects the circumference of the core layer 20 together with the edges of the skin layer 1 from external factors such as impacts. Furthermore, the finishing unit 332 protects the core layer 20 by blocking foreign materials such as rainwater, snow, dusts, and so forth. By reinforcing impact load, the thickness of the body 331 can be reduced. The finishing unit 332 is made of aluminum for controlling load and permanent deformation amount of a product. The finishing unit 332 is coupled with the body 331 using a coupling means such as rivets or screws with overlapping with the skin layer 1.

The hinge unit 333 includes a first member 333a and a second member 333b. The hinge unit 333 is positioned in the outer skin 30 to be arranged in the length direction of the body 331.

The first member 333a is in contact with the outer skin 30, and the second member 333b is coupled with the circumference of the deck 310. The first member 333a is hinge-connected to the second member 333b. The first member 333a is movable based on the hinge. The hinge unit 333 is made of steel.

By the hinge unit 333, when packages are unloaded and loaded from the deck 310, the body 331 can be opened together with the tail gate 320 in which the link member of the side gate 330 is separated.

The side gate 330 further includes a reinforcement bar 334.

The reinforcement bar 334 is positioned in the inner skin 10 to be arranged and contact in the length direction of the body 331. The reinforcement bar 334 and the first member 333a are combined each other by a coupling means such as rivets penetrating the body 331. The reinforcement bar 334 reinforces the inner skin 10 and enhances combination of the first member 333a. The reinforcement bar 334 and the first member 333a are independently combined with the body 331.

The side gate 330 further includes a binding member 336.

The binding member 336 is arranged at one side and the other side of upper parts of the outer skin 30, respectively. Fixing grooves (not shown) are formed in the binding members 336a and 336b. The fixing groove at one end of the binding member 336a is combined with the link member (not shown) connected with the riding part 200 or the front gate 340. The fixing groove at the other end of the binding member 336b is combined with the link member (not shown) of the tail gate 320. The binding member 336 is made of steel.

The present invention is essentially directed to the side gate 330 installed at both sides of the deck 310 in the width direction, but not limited to in this regard and can be used in the front gate 340 or the tail gate 320.

A plurality of the above deck gate 350 may be arranged in the length direction of the deck 310 according to the length of the deck 310.

Since the core layer 20 and the skin layer 1 of the body 331 are made of resins in the deck gate 350 of the present invention, they are lighter than a conventional deck gate, which is made of steel or wood. In addition, the deck gate 350 is not decayed to have excellent durability and impact strength and various excellent effects such as corrosion resistance, abrasion resistance, fatigue life, impact resistance, weight lightening, low-temperature resistance, and heat resistance.

Next, referring to FIGS. 5 to 10, a method for manufacturing a deck gate for truck will be described hereinafter.

Figure 5:
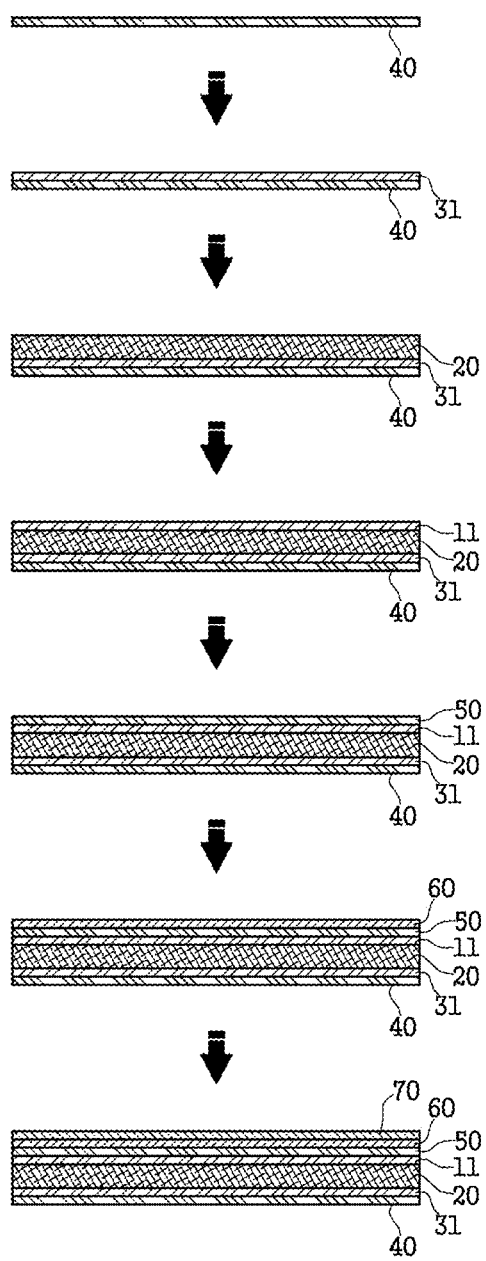
FIG. 5 shows a manufacturing process of a deck gate for truck with sand-witch panel type through VA-RTM process.
Figure 6:
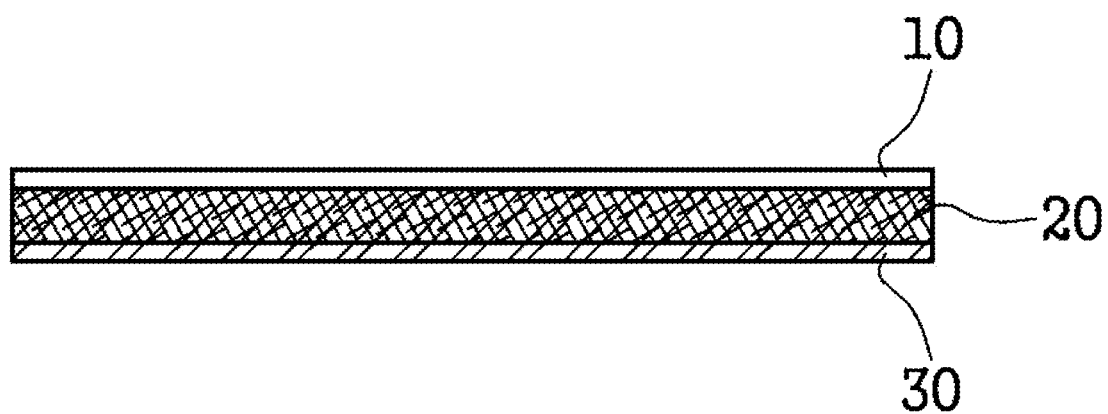
FIG. 6 is a schematic view showing a deck gate for truck manufactured through the process of FIG. 5.
Figure 7:
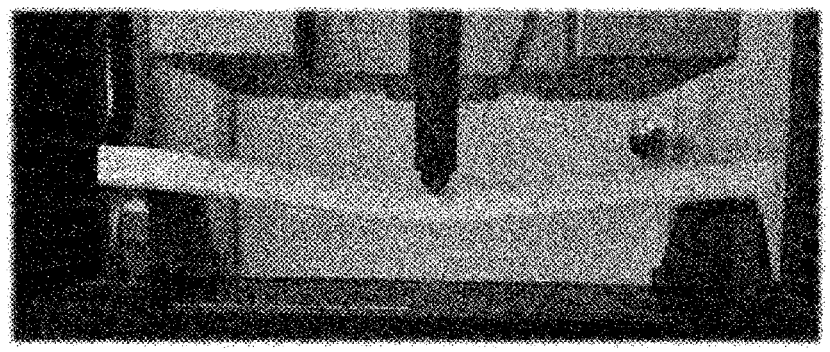
FIG. 7 shows data comparing whether a deck gate for truck of embodiment 4 identifies an analyzed model.
Figure 7:
Figure 7:
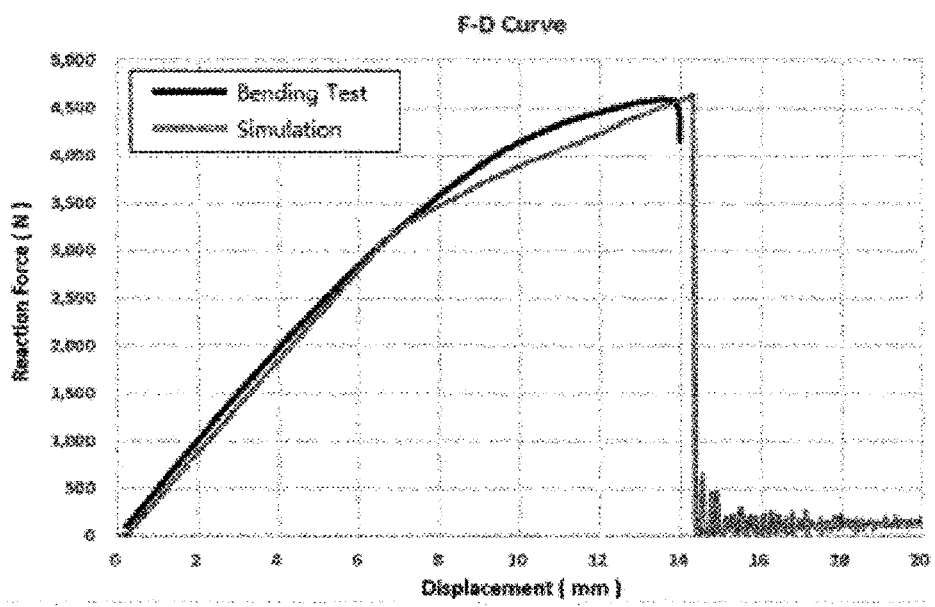
Figure 8:
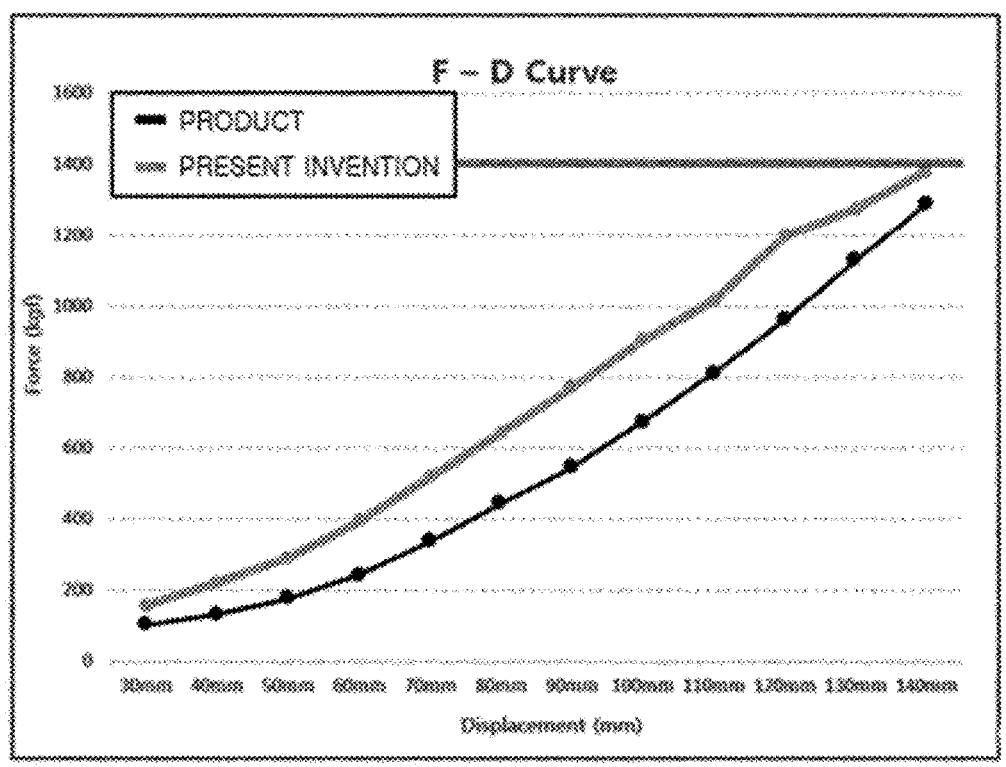
FIG. 8 shows data of load of products and plastic deformation rate in embodiment 4.
Figure 8:
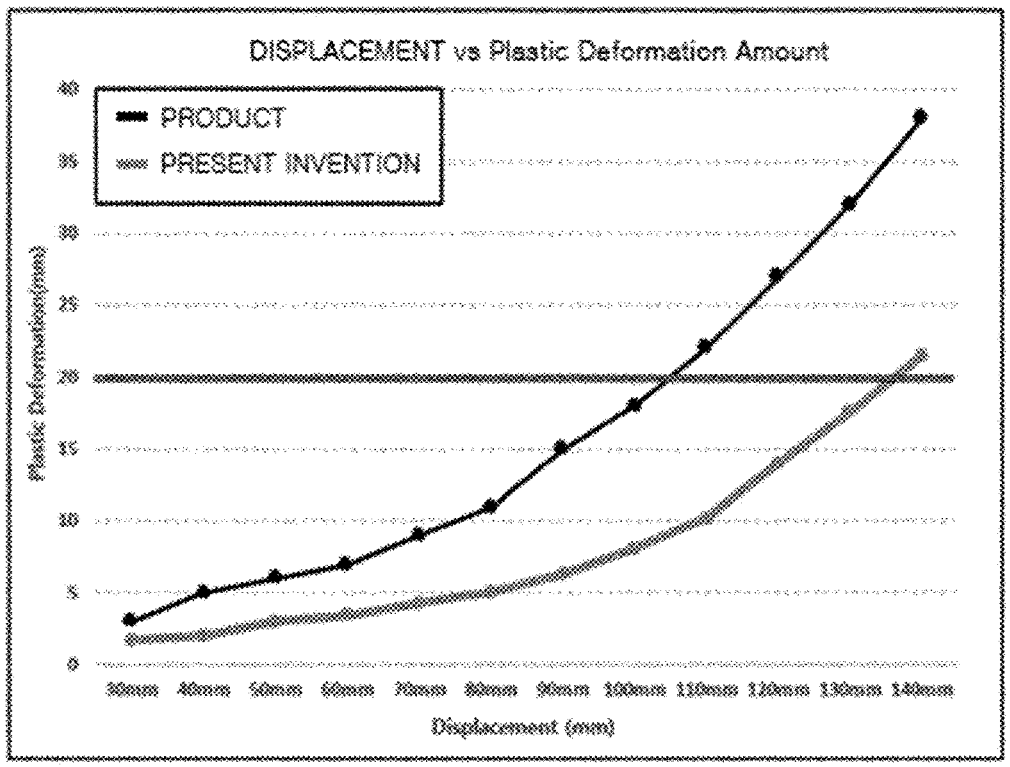
Figure 9:
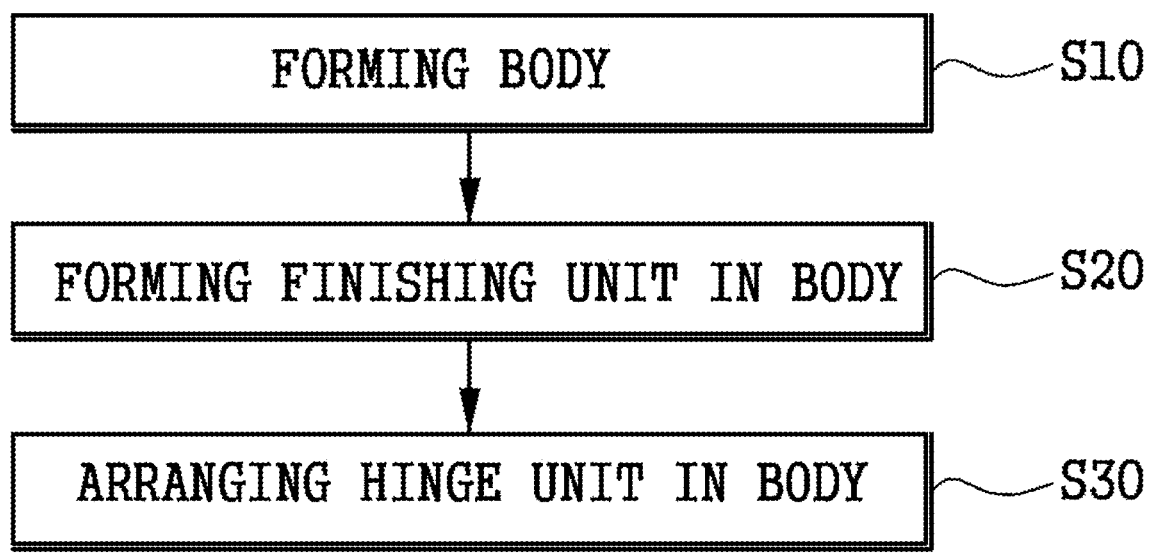
FIG. 9 is a block diagram of the manufacturing process of FIG. 5.
Figure 10:
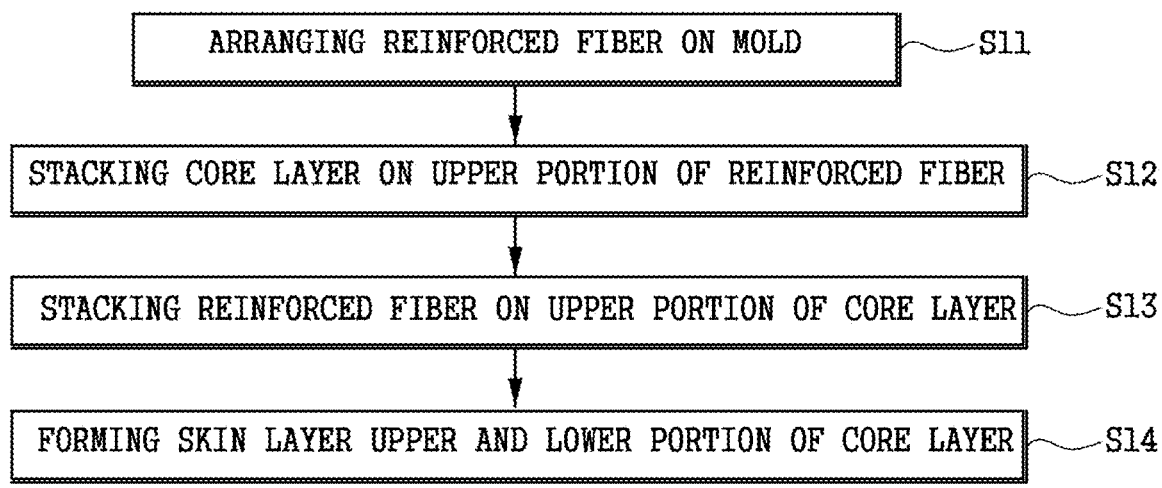
FIG. 10 is a block diagram showing steps forming a body of FIG. 9.
Figure 11:
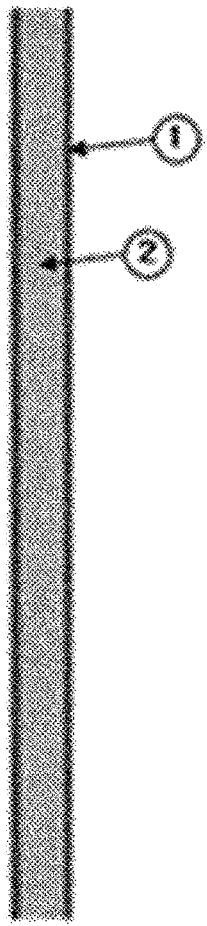
FIG. 11 is a measurement result of the properties of the skin layer and the core layer.

FIG. 5 shows a manufacturing process of a deck gate for truck with sand-witch panel type through VA-RTM process. FIG. 6 is a schematic view showing a deck gate for truck manufactured through the process of FIG. 5. FIG. 7 shows data comparing whether a deck gate for truck of embodiment 4 identifies an analyzed model. FIG. 8 shows data of load of products and plastic deformation rate in embodiment 4 and Comparative Embodiment 1. FIG. 9 is a block diagram of the manufacturing process of FIG. 5. FIG. 10 is a block diagram showing steps forming a body of FIG. 9.

Referring to FIGS. 5 to 10, a method for manufacturing a deck gate for truck of the present invention comprises forming a body including a core layer and a skin layer for protecting the core layer S10, arranging a finishing unit on circumference of the body S20, and arranging a hinge unit in the body S30.

The forming the body S10 comprises preparing a reinforced fiber with non-impregnated resin on a mold S11, stacking the core layer with foam type on an upper portion of the reinforced fiber S12, stacking the reinforced fiber with non-impregnated resin on an upper portion of the core layer S13, and impregnating resin in the reinforced fiber to form the skin layer hardened on the upper portion and a lower portion of the core layer S14. In this case, the outer skin 30, the core layer 20, and the inner skin 10 are sequentially stacked.

The deck gate of the present invention is manufactured by VA-RTM (Vacuum Assisted Resin Transfer Molding), press molding, vacuum molding, and so forth, but not limited to them. The VA-RTM is a process in which after softly arriving a reinforced fiber with non-impregnated resin to a mold, resin is impregnated, and the resin is impregnated by sucking internal air using a vacuum pump. In order to help a molding product and the mold unload, a release film 40 and a peel ply 50 are employed. A breather is used to absorb residual resins, and a bagging film 70 is used for sealing and vacuuming. The VA-RTM process for manufacturing the deck gate for truck is shown in FIG. 5.

In advance, the present invention includes preparing a reinforced fiber 31 with non-impregnated resin on a mold.

As shown in FIG. 5, the release film 40 is stacked on the mold, so that the outer skin positioned on lower parts of a deck gate molding for truck can be easily separated. Then, in order to manufacture the outer skin 30, a reinforced fiber with non-impregnated resin 31 is prepared on a mold.

The reinforced fiber 31 is one or more selected from the group consisting of a glass fiber, a carbon fiber, and an aramid fiber. The reinforced fiber 31 is a fabric in which wefts and warps are crossed or a fabric in which yarns are arranged in only one direction, but not limited thereto. The glass fiber is Glass NCF (Non-Crimp Fabric), UD (Uni-Directional), Towpreg, or Woven Roving, but limited to them.

The resin is one or more selected from the group consisting of epoxy, cyanate ester, vinyl ester, and unsaturated polyester. And, DCPD (Dicyclopentadiene) or IPA (Isopropyl Alcohol) may be employed as the unsaturated polyester, but not limited to them.

Next, the core layer with foam type 20 is stacked on the upper portions of the reinforced fiber 31.

In the present invention, the core layer 20 includes one or more selected from the group consisting of polyvinyl chloride resin, polyurethane resin, acryl resin, polystyrene resin, polyetherimide resin, and styrene-acrylonitrile copolymer. In the present invention, the term "foam" is used as a material molded by foaming and hardening resins using a foaming agent.

Then, the reinforced fiber with non-impregnated resin 11 is stacked on the upper portion of the core layer 20 to form a sequentially stacked structure of the reinforced fiber with non-impregnated resin 31, the core layer 20, and the reinforced fiber with non-impregnated resin 11.

Accordingly, as shown in FIG. 5, the stacked structure is positioned between the release film 40 and the peel ply 50, and in which the reinforced fiber with non-impregnated resin 31, the core layer 20, and the reinforced fiber with non-impregnated resin 11 are sequentially stacked.

Additionally, to easily separate the molding, the peel ply 50 is stacked on the stacked structure and a breather 60 is stacked on the peel ply, thereby absorbing surplus resin. For sealing and vacuuming, a bagging film 70 (marked in black) is stacked.

The reinforced fibers 11 and 31 are impregnated in the resin to form the hardened inner and outer skins 30 on the upper and lower portions of the core layer 20.

Vacuum is formed by inhaling internal air using a vacuum pump to impregnate resin on the reinforced fibers 11 and 31. The reinforced fibers 11 and 31 with impregnated resin are hardened to form the inner and outer skins 10 and 30, which are hardened on the upper and lower portions of the core layer 20. As a result, as shown in FIG. 6, the deck gate for truck with the sequentially stacked structure of the outer skin 30, the core layer 20, and the inner skin 30 is manufactured.

The above-manufactured deck gate for truck comprises the outer skin 30, the core layer 20 with foam type on the upper portion of the outer skin 30, and the inner skin 10 including the reinforced fiber and resin on the upper portion of the core layer 20, which are sequentially stacked.

Regarding the skin layer and the core layer, the density of the skin layer is ranged from 2,000 kg/m$^3$ to 3,000 kg/m$^3$, the tensile modulus of the skin layer is ranged from 2,000 MPa to 3,000 MPa, and the tensile strength of the skin layer is ranged from 300 MPa to 500 MPa. The density of the core layer is ranged from 50 kg/m$^3$ to 150 kg/m$^3$, the tensile modulus of the core layer is ranged from 50 MPa to 100 MPa, and the tensile strength of the skin layer is ranged from 1.5 MPa to 2.0 MPa.

In addition, the flexural modulus and flexural stress of the deck gate for truck is ranged from 2 GPa to 3 GPa and 25 MPa to 35 Mpa, respectively.

Regarding the outer skin 30, the core layer 20, and the inner skin 10, the thickness ratio of the outer skin 30, the core layer 20, and the inner skin 10 may be 1:5 to 7:1. More concretely, as shown in Table 2, the thickness ratio thereof may be 3.5:19:3.5, 3.05:19:3.05, or 3.25:19:3.25.

The outer skin 30 and the inner skin 10 include the reinforced fiber and resin. Concretely, resins are impregnated on the reinforced fiber to form the hardened outer and inner skins 30 and 10 on the lower and upper portions of the core layer 20. It is possible that the outer skin 30 is formed on the upper portion of the core layer 30, and the inner skin 10 is formed on the lower portion of the core layer 30.

The outer skin 30 and the inner skin 10 include the reinforced fiber of 40 weight % to 70 weight % and the resin of 30 weight % to 60 weight %, respectively. If the content of the reinforced fiber exceeds 70 weight %, fabric inclination may occur. In the fabric inclination section, the resin is not impregnated on the fabric, so that the interfacial adhesion between the fabric and the resin becomes reduced. Additionally, if the content of the reinforced fiber is less than 40 weight %, fabric portions being main factor of the property of the skin layer are small so that it is difficult to satisfy required properties, and accordingly, the structural stiffness is not satisfied.

The deck gate for truck sand-witch panel type in accordance with the present invention has advantages of excellent impact strength and low permanent deformation rate and employs foam-type resins to be a weight lightening. The deck gate for truck is light and not decayed for a long time to have excellent durability and impact strength. Furthermore, the deck gate for truck has excellent abrasion resistance, fatigue life, impact resistance, weight lightening, low-temperature resistance, and heat resistance.

Hereinafter, the present invention will be described in detail with reference to preferred embodiments illustrated. The present invention may, however, be embodied in different forms and should not be construed as limited to the embodiments set forth herein. The same reference numeral is used to refer to like elements throughout.

EXAMPLE 1. MANUFACTURING DECK GATE FOR TRUCK WITH SAND-WITCH PANEL TYPE INCLUDING SKIN LAYER AND CORE LAYER

Embodiment 1

A skin layer was formed using vinyl ester of 60 weight % as a resin and woven Roving of 40 weight % as a glass fiber. A core layer with foam type included PVC (Polyvinyl Chloride).

In advance, a woven-roving glass fiber with non-impregnated vinyl ester was cut meeting a pattern and then arranged on a mold. Then, a foam-type core layer including PVC was stacked on an upper portion of the glass fiber. The woven-roving glass fiber with non-impregnated vinyl ester was stacked on an upper portion of the core layer. After that, vinyl ester was impregnated on the glass fiber by sucking internal air using a vacuum pump and then was hardened to manufacture a deck gate for truck with sand-witch panel type in which an outer skin, the core layer on an upper portion of the outer skin, and an inner skin on the upper portion of the core layer (See FIGS. 5 and 6).

Embodiment 2

A deck gate for truck was manufactured in the same manner as in Embodiment 1, except that DCPD (Dicyclopentadiene) being unsaturated polyester of 60 weight % was used as resin and a woven roving of 40 weight % was used as a glass fiber.

Embodiment 3

A deck gate for truck was manufactured in the same manner as in Embodiment 1, except that IPA (Isopropyl alcohol) being unsaturated polyester of 60 weight % was used as resin and a woven roving of 40 weight % was used as a glass fiber.

Embodiment 4

A deck gate for truck was manufactured in the same manner as in Embodiment 1, except that DCPD (Dicyclopentadiene) being unsaturated polyester of 30 weight % was used as resin and a woven roving of 70 weight % was used as a glass fiber.

Embodiment 5

A deck gate for truck was manufactured in the same manner as in Embodiment 4, except that DCPD (Dicyclopentadiene) being unsaturated polyester of 40 weight % was used as resin and a woven roving of 60 weight % was used as a glass fiber.

Embodiment 6

A deck gate for truck was manufactured in the same manner as in Embodiment 4, except that DCPD (Dicyclopentadiene) being unsaturated polyester of 45 weight % was used as resin and a woven roving of 55 weight % was used as a glass fiber.

Embodiment 7

A deck gate for truck was manufactured in the same manner as in Embodiment 4, except that DCPD (Dicyclopentadiene) being unsaturated polyester of 50 weight % was used as resin and a woven roving of 50 weight % was used as a glass fiber.

Embodiment 8

A deck gate for truck was manufactured in the same manner as in Embodiment 4, except that DCPD (Dicyclopentadiene) being unsaturated polyester of 55 weight % was used as resin and a woven roving of 45 weight % was used as a glass fiber.

Comparative Embodiment 1

A deck gate for truck was manufactured in the same manner as in Embodiment 4, except that DCPD (Dicyclopentadiene) being unsaturated polyester of 80 weight % was used as resin and a woven roving of 20 weight % was used as a glass fiber.

Comparative Embodiment 2

A deck gate for truck was manufactured in the same manner as in Embodiment 4, except that DCPD (Dicyclopentadiene) being unsaturated polyester of 20 weight % was used as resin and a woven roving of 80 weight % was used as a glass fiber.

Following table shows the amount and sort of the resin and the glass fiber and manufacturing results.

TABLE 1

|  | Content and sort of Resin | Content and sort of Glass Fiber | Result |
| --- | --- | --- | --- |
| Embodiment 1 | Vinyl ester of 60 weight % | Woven Roving of 40 weight % | No non-impregnation of resin by fabric inclination Satisfying structure stiffness |
| Embodiment 2 | DCPD of 60 weight % | Woven Roving of 40 weight % | No non-impregnation of resin by fabric inclination Satisfying structure stiffness |
| Embodiment 3 | IPA of 60 weight % | Woven Roving of 40 weight % | No non-impregnation of resin by fabric inclination Satisfying structure stiffness |
| Embodiment 4 | DCPD of 30 weight % | Woven Roving of 70 weight % | No non-impregnation of resin by fabric inclination Satisfying structure stiffness |
| Embodiment 5 | DCPD of 40 weight % | Woven Roving of 60 weight % | No non-impregnation of resin by fabric inclination Satisfying structure stiffness |

TABLE 1-continued

| | Content and sort of Resin | Content and sort of Glass Fiber | Result |
|---|---|---|---|
| Embodiment 6 | DCPD of 45 weight % | Woven Roving of 55 weight % | No non-impregnation of resin by fabric inclination Satisfying structure stiffness |
| Embodiment 7 | DCPD of 50 weight % | Woven Roving of 50 weight % | No non-impregnation of resin by fabric inclination Satisfying structure stiffness |
| Embodiment 8 | DCPD of 55 weight % | Woven Roving of 45 weight % | No non-impregnation of resin by fabric inclination Satisfying structure stiffness |
| Comparative Embodiment 1 | DCPD of 80 weight % | Woven Roving of 20 weight % | Not Satisfying structure stiffness |
| Comparative Embodiment 2 | DCPD of 20 weight % | Woven Roving of 80 weight % | Non-impregnation of resin by fabric inclination |

As shown in the above table 1, in the embodiment 1 to 8, the resin was evenly impregnated on the fabric, and fabric inclination did not occur. In addition, the structure stiffness suitable for the deck gate was satisfied. However, in the comparative embodiment 1, the structure stiffness suitable for the deck gate was not satisfied because the content of the glass fiber was low. In the comparative embodiment 2, a section where the resin was not impregnated by the fabric inclination occurred.

EXAMPLE 2. MEASURING PROPERTY OF SKIN LAYER AND CORE LAYER OF DECK GATE FOR TRUCK

The properties of the skin layer and the core layer of the deck gate for truck in the embodiment 4 were measured. As a result, the density of the skin layer and the core layer was 2,275 kg/m$^3$ and 60 kg/m$^3$, respectively. The tensile modulus of the skin layer and the core layer was 21,000 MPa and 75 MPa, respectively. The tensile strength of the skin layer and the core layer was 400 MPa and 1.8 MPa, respectively.

EXAMPLE 3. FORMALITY TEST OF DECK GATE FOR TRUCK WITH SAND-WITCH PANEL TYPE

The formality of the deck gate for truck with sand-witch panel type was evaluated in the embodiments 1 to 4. As a result, the deck gate for truck with sand-witch panel type satisfied the formality.

TABLE 2

| | Material | | | Sample Dimension | | | | | |
|---|---|---|---|---|---|---|---|---|---|
| VA-RTM Process | Skin Resin | Fiber | Core Foam | Thick. (2 * Skin/Core) | Layer (upper portion/core/lower portion) | Size (mm) | Weight (kg) | Weight/m$^2$ (kg/m$^2$) | Formability |
| Embodiment 1 | Vinyl Ester | Woven Roving | PVC | 26 (7/19) | 4/1/4 | 400 × 300 | 2.0 | 15.2 | OK |
| Embodiment 2 | Unsaturated Polyester (DCPD Impact resistance) | Woven Roving | PVC | 26 (7/19) | 4/1/4 | 400 × 300 | 2.0 | 15.2 | OK |
| Embodiment 3 | Unsaturated Polyester (DCPD Impact resistance) | Woven Roving | PVC | 25.2 (6.1/19) | 6/1/6 | 300 × 500 | 2.0 | 13.5 | OK |
| Embodiment 4 | Unsaturated Polyester (DCPD Impact resistance) | Woven Roving | PVC | 25.2 (6.5/19) | 6/1/6 | 300 × 500 | 2.0 | 13.5 | OK |

EXAMPLE 4. IMPACT TEST

Figure 12:
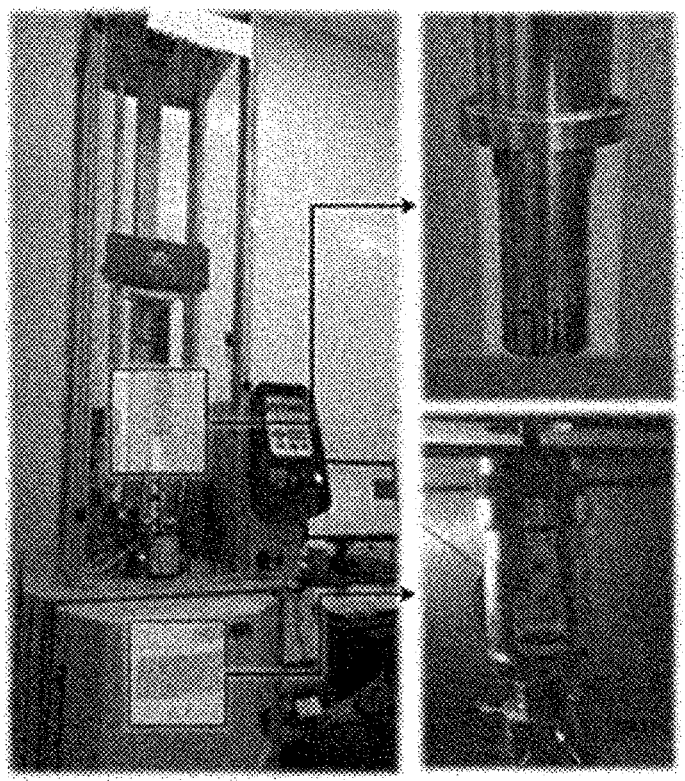
FIG. 12 is an impact test method.

In order to verify the property of a material of a conventional deck gate for truck and the deck gate for truck according to the embodiment 4, the impact test was performed with respect to aluminum boards and FRP (Fiber Reinforced Plastics) for verifying a material property of a skin layer, which is a most important factor. Test methods and results are shown in FIG. 12 and FIG. 13.

As shown the following FIG. 13, it was the deck gate for truck in the embodiment 4 had similarly high energy absorption at room temperature and low temperature, and high load. On the other hand, the energy absorption of a deck gate for truck with aluminum-board type could not be measured at low temperature and load was low as compared with that of the embodiment 4. In addition, the energy absorption of a deck gate for truck with FRP-board type was dramatically low and load was much lower than that of the embodiment 4. The deck gate for truck according to the present invention had excellent energy absorption, high load, and excellent cold resistance and heat resistance because the property degradation thereof depending on temperature variation is low.

EXAMPLE 5. MEASURING FLEXURAL MODULUS AND FLEXURAL STRESS OF DECK GATE FOR TRUCK WITH SAND-WITCH PANEL TYPE

Figure 14:
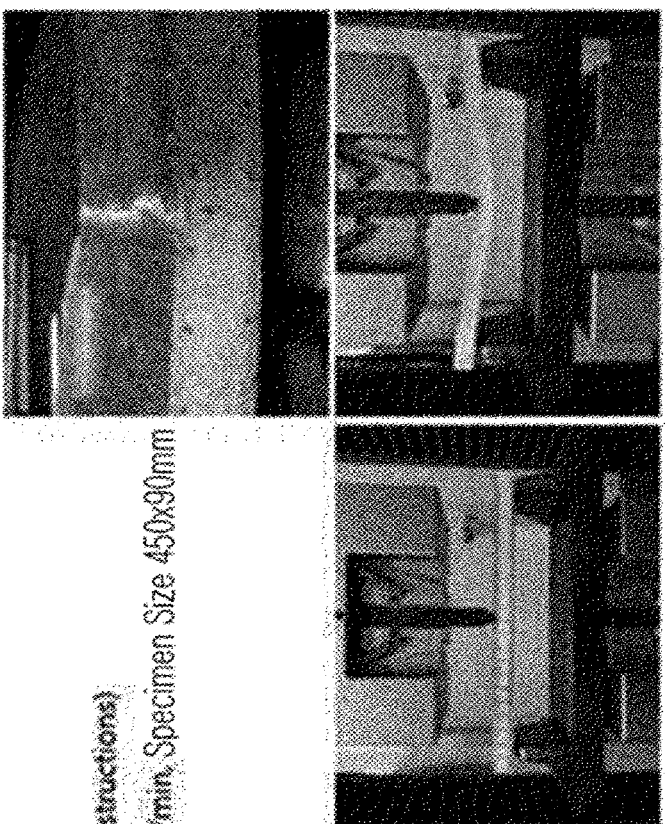
FIG. 14 shows the result of measuring the flexural modulus and flexural stress of the deck gate.

According to conditions of the following FIG. 14, the flexural modulus and flexural stress of the deck gate for truck of the embodiment 4 were measured. The flexural modulus and flexural stress of the deck gate for truck were 2.17 GPa and 29.54 MPa, respectively.

EXAMPLE 6. STATIC LOAD TEST

A static load test was performed to measure load and a permanent deformation rate.

As a test condition, a speed was 1 mm/sec, a maximum displacement was 140 mm (after removing load for 10 mm unit, permanent deformation rate of a product was measured), the static test was performed based on a jig having the same form as a vehicle assembly, and the maximum load of 1,300 kg was required if the maximum displacement of 140 mm was given to a center of the product based on the same constraint condition as the vehicle assembly.

As a test result, the flexural stiffness and strength of the deck gate for truck with sand-witch panel type were measured employing the flexural test as shown in FIG. 7. In order to deduct a weight lightening model through interpretive verification, the co-relation the flexural test result of the deck gate for truck of the embodiment 4 with an interpretive model was evaluated. As a result, the flexural test result of the deck gate for truck of the embodiment 4 is consistent with the interpretive model to confirm that the deck gate for truck was suitable.

In addition, the impact test of a conventional product in which a skin layer was made of steel and a core layer is made of wood and the deck gate for truck according to the present invention was tested and compared as shown in FIG. 8. As a result, it was shown that the deck gate for truck of the embodiment 4 had higher load than the conventional product within all test displacements. In the displacement of 140 mm, the maximum load was 1,380 kgf, and this meant that the performance was enhanced at approximately 5% as compared with the conventional product. In addition, it was shown that a permanent deformation amount was 22 mm at the maximum, and this meant that the performance was enhanced at approximately 40% as compared with the conventional product.

Accordingly, the deck gate for truck according to the present invention had many advantages in that load was high and the permanent deformation amount was low.

EXAMPLE 7. WEIGHT LIGHTENING TEST

Figure 15:
FIG. 15 shows weight lighting test method and test results.
Figure 15:
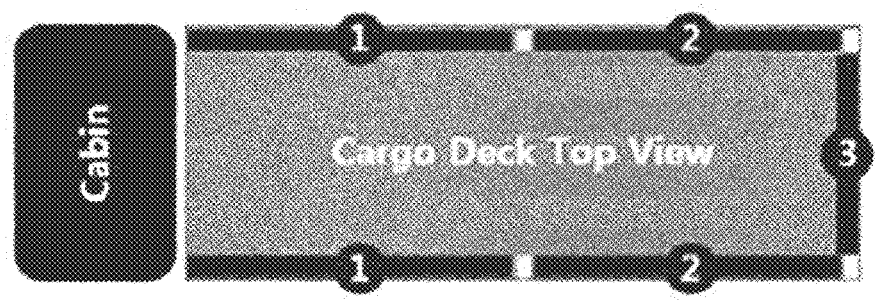
Figure 15:
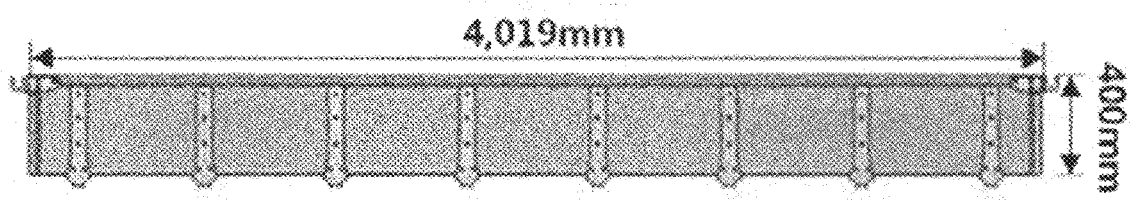
Figure 15:
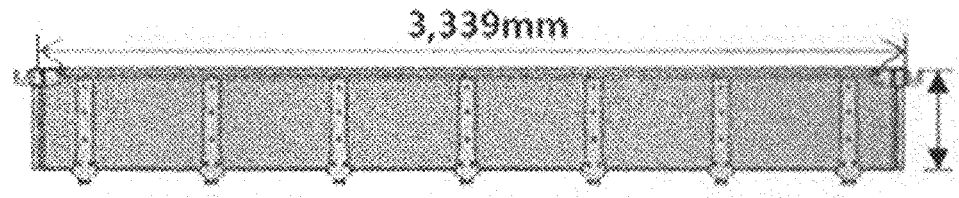
Figure 15:
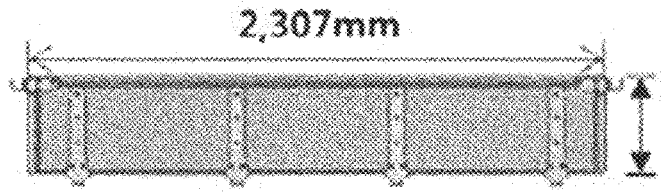

Comparing with a conventional product in which a skin layer was made of steel and a core layer is made of wood, the weight of the deck gate for truck of the embodiment 4 was measured. The test method and results are shown in FIG. 15.

Resultantly, one set of the deck gate for truck was mounted at both sides of two kinds of side gates, and one tail gate was mounted. The total weight was 200 kg, and this meant that the weight was reduced at approximately 23% in comparison with the conventional deck gate for truck of 258 kg.

According to the present invention, a truck, a deck gate for truck, and a method for manufacturing thereof comprising forming a body including a core layer and a skin layer for protecting the core layer, arranging a finishing unit on circumference of the body, and arranging a hinge unit in the body. The deck gate for truck is light and not decayed for a long time to have excellent durability and impact strength. Furthermore, the deck gate for truck has excellent abrasion resistance, fatigue life, impact resistance, weight lightening, low-temperature resistance, and heat resistance.

All such changes, modifications, variations and other uses and applications which do not depart from the spirit and scope of the invention are deemed to be covered by the invention which is limited only by the claims which follow.

What is claimed is:

1. A deck gate for truck, comprising:
a body located outside a deck of a loading part,
wherein the body includes a core layer made of resins,
a skin layer including a reinforced fiber and resins and respectively arranged on one surface and the other surface of the core layer,
a finishing unit arranged along an outer circumstance of the body, and
a plurality of hinge units connecting the body to the deck,
wherein the skin layer includes an inner skin arranged on the one surface of the core layer, and an outer skin arranged on the other surface of the core layer where the plurality of hinge units are arranged at a predetermined interval,
wherein a plurality of reinforced bars are arranged at a predetermined interval in the inner skin, and
wherein the plurality of reinforced bars are respectively connected to the plurality of hinge units.

2. The deck gate of claim 1, wherein the reinforced fiber is one or more selected from the group consisting of a glass fiber, a carbon fiber, and an aramid fiber, and the resin is one or more selected from the group consisting of epoxy, cyanate ester, vinyl ester, and unsaturated polyester.

3. The deck gate of claim 1, wherein the outer skin and the inner skin have 40 to 70 weight % of the reinforced fiber and 30 to 60 weight % of the resin, respectively.

4. The deck gate of claim 1, wherein the core layer includes one or more selected from the group consisting of polyvinyl chloride resin, polyurethane resin, acryl resin, polystyrene resin, polyetherimide resin, and styrene-acrylonitrile copolymer.

5. A truck including the deck gate for truck of claim 1, comprising:
- a vehicle body frame;
- a riding part located at one end of the vehicle body frame; and
- a loading part located at the other end of the vehicle body frame,
- wherein the loading part includes a deck, a tail gate opposite to the riding part at a predetermined interval and mounted on the deck, and a couple of side gates opposite each other at a predetermined interval between the riding part and the tail gate.

* * * * *